(12) United States Patent
Vastano et al.

(10) Patent No.: US 11,106,472 B2
(45) Date of Patent: Aug. 31, 2021

(54) METHOD FOR MANAGING MULTIPLE OPERATING SYSTEMS IN INTEGRATED CIRCUIT CARDS, CORRESPONDING SYSTEM AND COMPUTER PROGRAM PRODUCT

(71) Applicant: STMicroelectronics S.r.l., Agrate Brianza (IT)

(72) Inventors: Pasquale Vastano, Santa Maria Capua Vetere (IT); Amedeo Veneroso, Caserta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 231 days.

(21) Appl. No.: 16/375,695

(22) Filed: Apr. 4, 2019

(65) Prior Publication Data
US 2019/0310860 A1 Oct. 10, 2019

(30) Foreign Application Priority Data

Apr. 6, 2018 (IT) .................. 102018000004293

(51) Int. Cl.
*G06F 1/24* (2006.01)
*G06F 9/00* (2006.01)
(Continued)

(52) U.S. Cl.
CPC ............. *G06F 9/441* (2013.01); *G06F 8/61* (2013.01); *G06F 8/654* (2018.02); *G06F 8/658* (2018.02);
(Continued)

(58) Field of Classification Search
None
See application file for complete search history.

(56) References Cited

U.S. PATENT DOCUMENTS

2002/0120885 A1* 8/2002 Choi .................... H04N 21/435
714/38.1
2010/0180271 A1 7/2010 Arsenault et al.
(Continued)

FOREIGN PATENT DOCUMENTS

EP 2448216 A1 5/2012

OTHER PUBLICATIONS

Han, Chih-Chieh et al., "A Dynamic Operating System for Sensor Nodes," USENIX Association, The Third International Conference on Mobile Systems, Applications, and Services, May 24, 2005, 14 pages.

*Primary Examiner* — Nitin G Patel
(74) *Attorney, Agent, or Firm* — Slater Matsil, LLP (57) ABSTRACT

A method for managing storage of an operating system in an integrated circuit card, includes: subdividing an operating system into a plurality of operating system components; associating one or more operating system components of the plurality of operating system components to a descriptor indicating a version of the one or more operating system components; downloading the one or more operating system components to a memory of the integrated circuit card, wherein the downloading includes verifying if an operating system component stored in the integrated circuit card is a same version of the one or more operating system components being downloaded; based on the verifying, storing the one or more operating system components in the card if the version is different; and based on the verifying discarding the one or more operating system components from the download operation if the version is the same.

20 Claims, 6 Drawing Sheets

(51) Int. Cl.

| | |
|---|---|
| *G06F 9/4401* | (2018.01) |
| *H04L 9/08* | (2006.01) |
| *G06F 8/61* | (2018.01) |
| *G06F 9/445* | (2018.01) |
| *G06F 8/654* | (2018.01) |
| *G06F 8/658* | (2018.01) |

(52) U.S. Cl.
CPC ........ *G06F 9/4406* (2013.01); *G06F 9/44521* (2013.01); *H04L 9/0825* (2013.01)

(56) References Cited

U.S. PATENT DOCUMENTS

| | | |
|---|---|---|
| 2011/0154313 A1 | 6/2011 | Nolterieke et al. |
| 2012/0108207 A1* | 5/2012 | Schell .................. H04W 4/50 455/411 |
| 2013/0019236 A1 | 1/2013 | Nakagawa et al. |

* cited by examiner

METHOD FOR MANAGING MULTIPLE OPERATING SYSTEMS IN INTEGRATED CIRCUIT CARDS, CORRESPONDING SYSTEM AND COMPUTER PROGRAM PRODUCT

CROSS-REFERENCE TO RELATED APPLICATIONS

This application claims priority to Italian Patent Application No. 102018000004293, filed on Apr. 6, 2018, which application is hereby incorporated herein by reference.

TECHNICAL FIELD

Embodiments of the present disclosure relate to a method for managing multiple operating systems in integrated circuit cards, a corresponding system and a computer program product.

BACKGROUND

Universal Integrated Circuit Cards (UICCs), often referred as Subscriber Identity Module (SIM) card, are widely used to enable the mobile devices to access services provided by Mobile Network Operators (MNOs).

Figure 1:
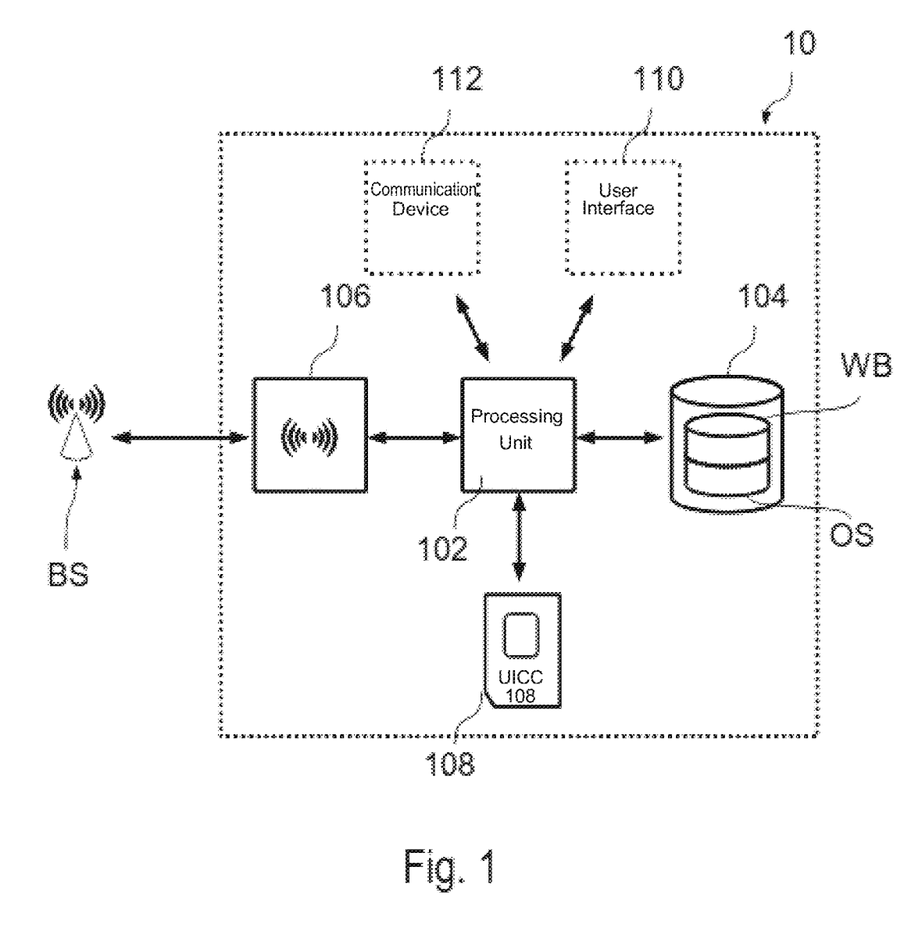

In this context, FIG. 1 shows a possible architecture of user equipment 10, such as a mobile device, e.g. a smartphone or a tablet, or a mobile communication module usually to be used in embedded systems.

Generally, the device 10 includes one or more processors 102 connected to one or more memories 104. The device 10 also includes at least one mobile communication interface 106 for communication with a base station BS.

For example, the mobile communication interface 106 may include a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver.

The device 10 also includes a user interface no, such as a touchscreen. Conversely, a communication module to be used, e.g., in embedded systems, such as alarm systems, gas meters or other types of remote monitoring and/or control systems, often does not include a user interface no, but a communication interface 112 in order to exchange data with a further processing unit of an embedded system. For example, in this case, the interface 112 may be a digital communication interface, such as a UART (Universal Asynchronous Receiver-Transmitter), SPI (Serial Peripheral Interface) and/or USB (Universal Serial Bus) communication interface. Generally, the processing unit 102 may also be directly the main processor of an embedded system. In this case the interface 112 may be used to exchange data with one or more sensors and/or actuators. For example, in this case, the interface 112 may be implemented by means of one or more analog interfaces and/or digital input/output ports of the processing unit 102.

The memory 104 may store e.g. an operating system OS being executed by the processor 102 and which manages the general functions of the device 10, such as the management of the user interface no and/or the communication interface 112 and the establishment of a connection to the base station BS via the interface 106. The memory 104 may also contain applications being executed by the operating system OS. For example, in the case of a mobile device, the memory 104 often includes a web browser application WB.

For establishing a connection with the base station BS, the device 10 is coupled to a processing unit 108 configured to manage the identity identification of the user. For example, usually a mobile device includes a card holder for receiving a card including a Subscriber Identity Module (SIM), which is usually called SIM card. Generally a corresponding SIM module may also be installed directly within the device 10. In the example of FIG. 1 it is used a Universal Integrated Circuit Card (UICC) 108, which is a smart card often used in GSM and UMTS networks. The UICC ensures the integrity and security of all kinds of personal data and typically holds a few hundred kilobytes. Also a UICC may be integrated directly in the device 10 and is in this case often called embedded UICC (eUICC).

For example, in a GSM network, the UICC 108 contains a SIM application and in a UMTS network, a USIM application. A UICC may contain several applications, making it possible for the same smart card to give access to both GSM and UMTS networks, and may also provide storage of a phone book and other applications.

Accordingly, the reference to a SIM module in the following of the present description is intended to include modules for the above network and applies also the case in which such a SIM module is provided on a SIM card.

Figure 2:
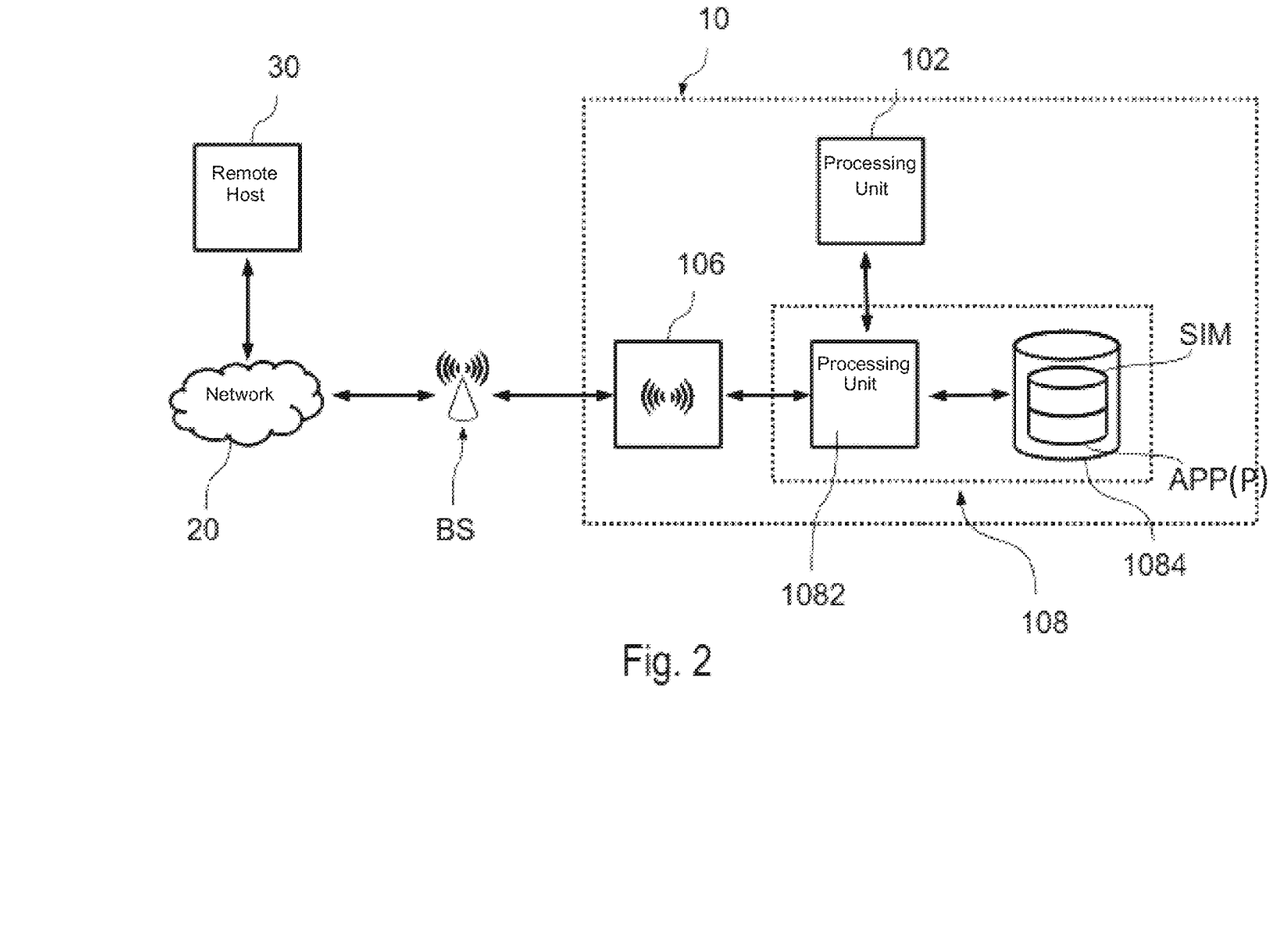

As shown in FIG. 2, a SIM module 108 often includes one and more processors 1082 and one or more memories 1084 for executing applications stored in the memory 1084 of the module 108. For example, the SIM module 108 may include in addition to the Subscriber Identity Module application (reference sign SIM in FIG. 2) at least one further application APP. For example, this application APP may be configured to communicate (directly, or indirectly via the processor 102 and possibly the operating system OS) with the mobile communication interface 106 in order to send data to and/or receive data from a remote host 30. For this purpose, the host 30 may be connected via a network 20, such as a Local Area Network (LAN) or a Wide Area Network (WAN), such as the internet, to the base station BS. Accordingly, connection between the host 30 and the UICC 108 may be established by the network 20, the base station BS and the communication interface 108. Generally, the communication may be initiated by the host 30 or the UICC 108. For example, the application APP may be a web server application, which receives requests from the web browser WB of a mobile device 10 and obtains respective content from a remote host 30, such as a web server. The application APP may also be an authentication application. In this case, the host 30 may send an authentication request to the UICC 108 and the UICC 108 may send an authentication response to the host 30. The memory or a plurality of memories 1084 can be used also to store data images including the profile or the profiles pertaining different MNOs and operating systems related to the image. For image is here intended a structured representation of binary information, which is also encrypted, which is also configured to decrypt encapsulated data, manage rights and check the integrity of loaded decrypted data.

Thus, a UICC card in short usually includes a microprocessor and a memory, typically including a non-volatile and a volatile portion. Such memory is configured to store data such as an operating system, applets and an MNO profile that a mobile device can utilize to register and interact with an MNO. The UICC can be removably introduced in a slot of a device, i.e. a mobile device, or they can also be embedded directly into the devices, in this case they are called eUICC. Such eUICC cards are useful since for their nature are designed to remotely receive MNO profiles.

Such profiles however have to be personalized with data specific of the card, such as the authentication keys. The embedded UICC is an evolution of the actual UICCs that allows the possibility of downloading multiple profiles on the card representing different telecom operators. The main use case, as mentioned, is to "solder" an eUICC in a specific device; as the eUICC is not removable, if the device owner wants to change telecom operator (e.g. from Vodafone to TelecomItalia), the eUICC should be able to update the telecom credentials. Such telecom credentials are included in a profile that fully represents one operator in containing all the information. One missing point in the eUICC cards is the possibility (true for traditional SIMs) for the MNO to customize the operating system.

An eUICC card can have stored in its non-volatile memory an operating system and the profile of a first MNO. A profile of a second MNO can be loaded in such memory by a load operation, resulting in a configuration in which the first profile is active and the second profile is disabled. Then with a delete operation on the first profile and an enable operation, the card is configured to have the sole second profile, enabled for operation. The profile and the operating system are downloaded through a network such as the network 20, from a remote host such as the remote host 30, including for instance one or more or server. Such servers can correspond to MNO remote servers, sometimes defines as Profile Creator, where the profiles are designed and the downloaded through the mobile network in the card.

Thus, in embedded UICC cards the profile can change, but the operating system cannot.

However also are known integrated circuit cards which use a Primary Boot Loader.

A Primary Boot loader (PBL) is usually stored in a portion of the non-volatile memory or in one memory if a plurality of non-volatile memory is provided.

The PBL is configured, when activated, for loading an image, e.g. containing a profile of a MNO, and/or launching (or bootstrapping) an operating system related to such image when the MNO accesses the card of for other operations of management of the image such as deletion.

Figure 3A:
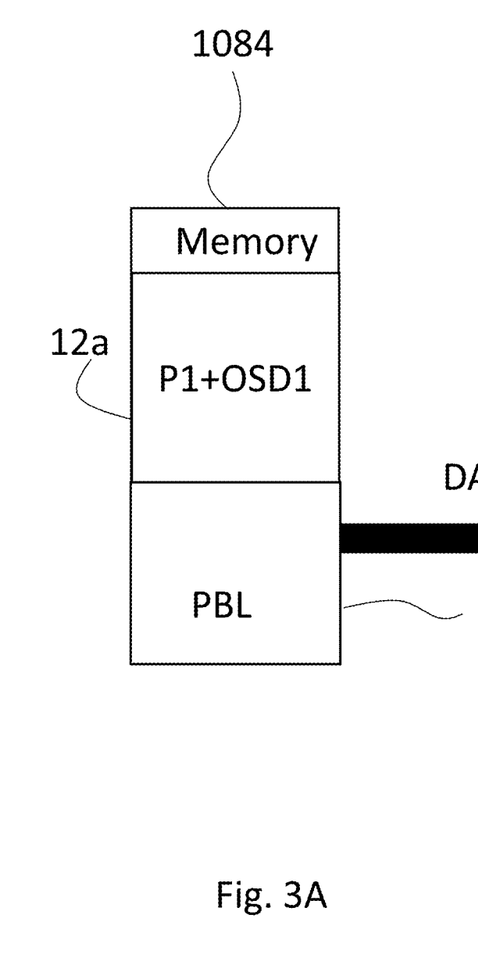
Figure 3B:
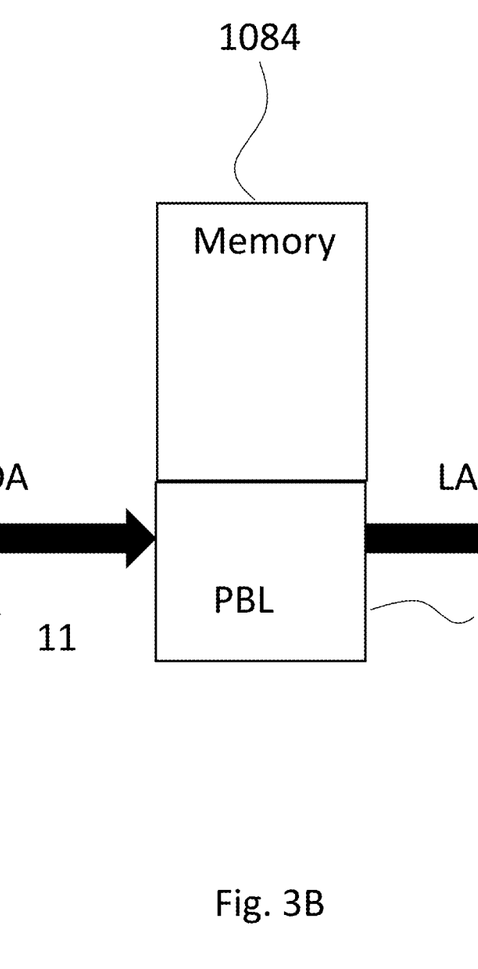
Figure 3C:
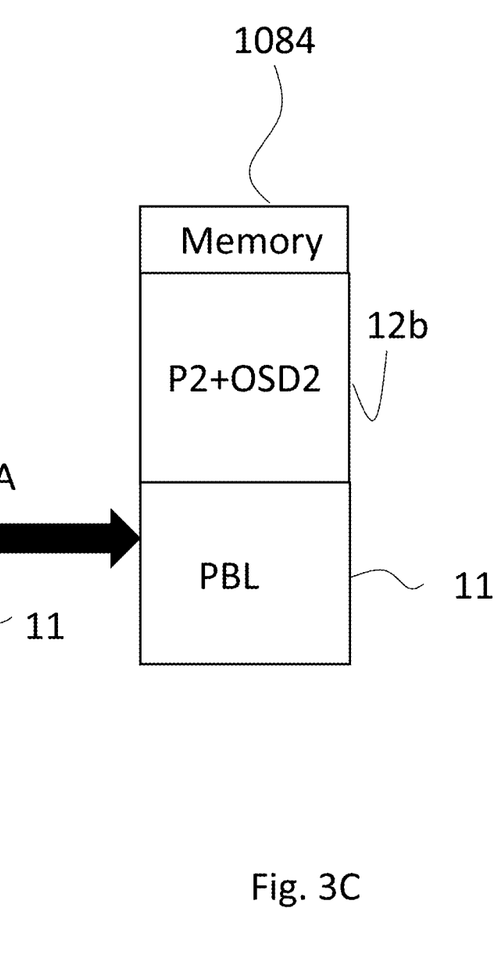

In this regard, FIG. 3A schematically shows the non-volatile memory 1084 in an area of which is stored a primary boot loader 11, which is used for securely loading the subsequent software, for instance from the MNO remote server, in another area of the memory 1084, represented by a first profile P1 and operating system OSD1 as a single first data package 12a. Therefore, to change the first profile P1 and operating system OSD1 is performed a delete operation DA to obtain the configuration of the memory 1084 of FIG. 3B, in which there is no package 12a as it was deleted, then a load operation LA through the primary boot loader 11, loading a second data package 12b including a second profile P2 and a corresponding second operating system OSD2.

The limitation of "one profile per time" is quite strong in solutions of UICC cards using the PBL, however there are several applicative scenarios in which the presence of several profiles together may be useful, such as:

multi SIM (e.g. dual SIM) handsets;

download of a profile via OTA (an additional profile to offer the connectivity is needed)—needed for M2M solutions;

connectivity backup, so that in case of loss of connectivity of a first MNO, it is possible to back up to another MNO; and/or roaming simplification, so that, for instance, depending on the country a specific profile is enabled).

A solution to the problem in the context of PBL using UICC cards would be represented by having different image for each MNO with a respective primary boot loader. However, since typically the operating system size is around 600-700 kb for high end cards, such profile size is around 150 kb. Thus, to accommodate two profiles in a card using a primary boot loader, one would need cards with very large memory.

SUMMARY

On the basis of the foregoing description, the need is felt for solutions which overcome one or more of the previously outlined drawbacks.

Embodiments concerns a related system for the personalization of profiles in integrated circuit cards as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

As mentioned in the foregoing, the present disclosure provides solutions regarding a method for managing the storage of an operating system in an integrated circuit cards including using a primary boot loader to load selected operating system, including:

subdividing an operating system in a plurality of operating system components;

associating one or more of the components in the plurality of operating system components to a descriptor indicating a version of the operating system component;

downloading the one or more components to a non-volatile memory of the integrated circuit card, the downloading operation including verifying if there is stored in the card an operating system component associated to a same version of the component being downloaded;

storing the component in the card if the version is different; and discarding the component from the download operation if the version is the same.

In variant embodiments, the method here described may include associating each component of the plurality of operating system components to a descriptor indicating a version of the operating system component, and downloading each component of the one or more components to the non-volatile memory of the integrated circuit card.

In variant embodiments, the method here described may include associating a determined component of the plurality of operating system components to a descriptor indicating a version of the operating system component, and downloading the component of the one or more components to the non-volatile memory of the integrated circuit card.

In variant embodiments, the method here described may include that the verifying operation includes comparing the version of the one ore components being downloaded to the version of corresponding components already stored in the memory of the card in a version table also residing in the memory, in particular in the primary boot loader.

In variant embodiments, the method here described may include that the one or more components include one or more among Kernel, Java Card, SMS protocol, Authentication, USIM, Global Platform components.

In variant embodiments, the method here described may include that when a profile switch is performed includes performing a dynamic linking operation on the components stored in the memory after the step of verifying if there is stored in the card an operating system component associated to a same version of the component being downloaded.

In variant embodiments, the method here described may include isolating the one or more component by defining the one or more component as a library, including an interface with the methods exposed.

In variant embodiments, the method here described may include storing one or more of the following components in the card:
  an import descriptor indicating:
    which module is imported and which version; and/or
    which APIs are invoked:
  an export descriptor indicating:
    which API is exported; and/or
    which is the version of the component.

In variant embodiments, the method here described may include that it is stored in the card an operating system component associated to a same version of the component being downloaded, and a downloading server retrieves the corresponding information, in particular from a version table and performs the verifying at the server.

The present disclosure provides also solutions regarding a system for managing the storage of an operating system in an integrated circuit cards, in particular a eUICC card, including an integrated circuit card configured to operate in a mobile device and a remote server configured to exchange data with the device and the card configured to implement the method of any of the previous embodiments.

The present disclosure provides also solutions regarding an integrated circuit card, in particular a UICC or eUICC card, configured to operate in the previous system.

The present disclosure provides also solutions regarding a computer-program product that can be loaded into the memory of at least one processor and includes portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting example and in which:

FIGS. 1, 2, and 3A to 3C have been already described in the foregoing;

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to FIGS. 1, 2, and 3A to 3C are denoted by the same references previously used in such Figures; the description of such previously described elements will not be repeated in the following in order not to overburden the present detailed description.

Embodiments of the present disclosure relate to methods for managing the storage of an operating system in an integrated circuit card including using a primary boot loader to load a selected operating system.

Embodiments of the present disclosure relate in particular to eUICC (embedded Universal Integrated Circuit Card).

The solution here described substantially is based on the observation that even if the MNOs require different operating systems, the differences are represented by a customization of same operating system. Thus, considering two operating systems by two different MNOs, they are very similar, e.g. 95% of memory contains images with the same binary information, while only the remaining 5% is different.

In particular, considering the operating system as including a plural of components, only a few components among such components are subjected to the customization, while the other components remain the same.

Therefore in brief, the method here described for managing the storage of an operating system in an integrated circuit card, in particular managing multiple operating system in an integrated circuit card, using a primary boot loader, provides subdividing each operating system in a plurality of operating system components, such as Kernel, Java Card, SMS protocol, Authentication, USIM, Global Platform, such as, by way of non-limiting example, the component of the JCOP (Java Card OpenPlatform). Then each operating system component is associated to a descriptor indicating a version of the operating system sub-module. These operations are performed at the operating system developer, or possibly at the operating system provider, i.e. remotely with respect to the card, and in any case prior downloading the operating system in the memory of such card.

When a given operating system is downloaded in the card, the card is configured through its processing unit to store in a table available at the card memory table the version of each component of the given operating system.

When it is necessary to download a further operating system to the card, the version of the components of the further operating system is compared to the version of the components of the given operating system.

If the version is the same, the component of the given operating system and further operating system are considered as binary equal and the download of the corresponding component is discarded. If the version is different the component of the further operating system is stored in the memory of the card. When the card, after downloading, performs the profile switch including changing the operating system, the further operating system uses the modules with the same version of the first profile previously stored and performs a dynamic linking to execute the newly store modules having a different version.

Figure 4:
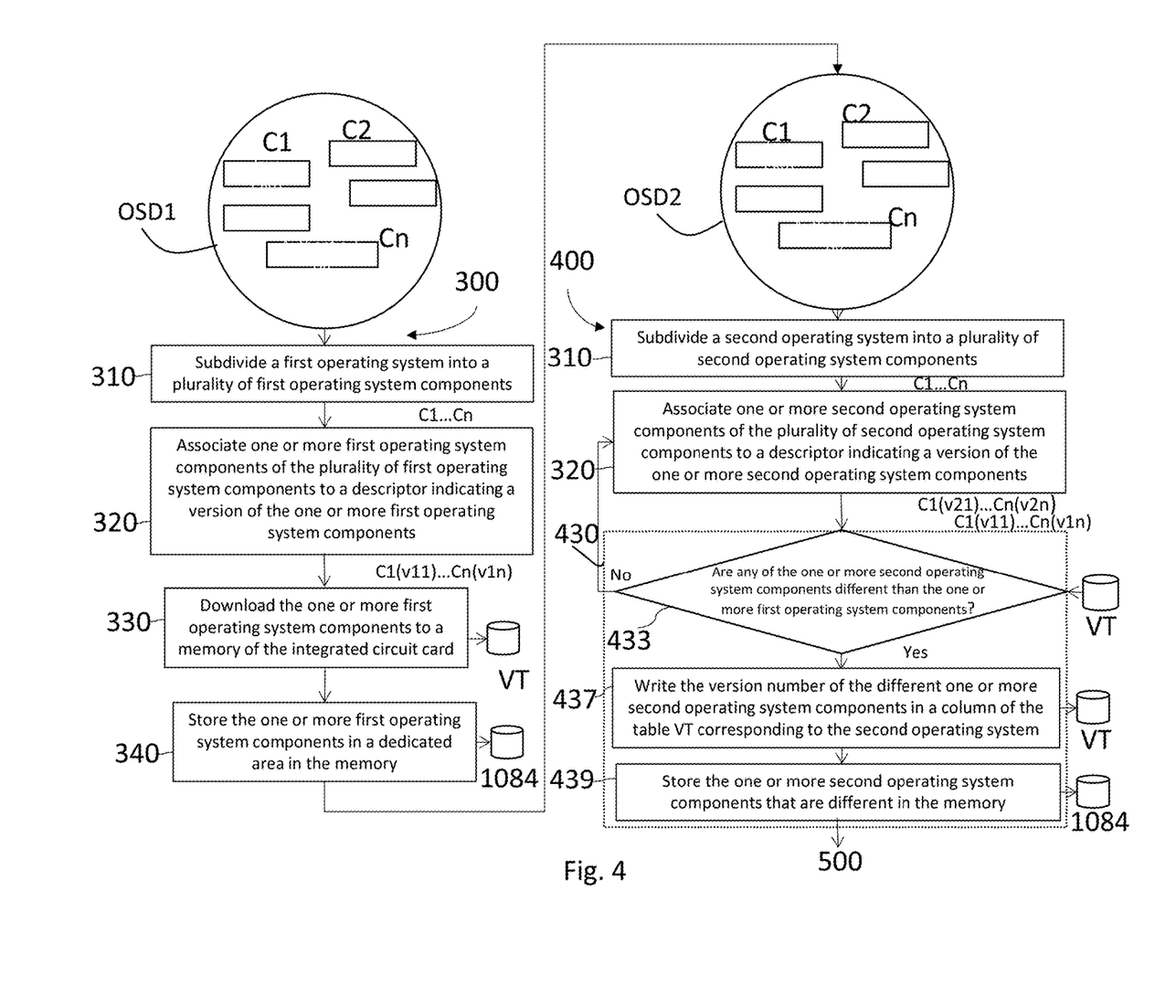
FIG. 4 shows a diagram flow illustrating an embodiment of the method here described.

FIG. 4 shows a flow diagram representing the method for managing the storage of an operating system in an integrated circuit card here described. With the numerical reference 300 is indicated a procedure of downloading of a first operating system OSD1 in the card 108, which includes an operation 310 of subdividing the first operating system OSD1 in a plurality of components C1 . . . Cn. Such subdivision 310 is performed at the MNO server, e.g. a host 30, when the operating system OSD1 is designed. Components C1 . . . Cn, which can include one or more among Kernel, Java Card, SMS protocol, Authentication, USIM, Global Platform, are identified in the operating system OSD1. This is an example list of operating system components, however other components can be identified or other subdivision can be performed, for instance aggregating two of the above components in a single component.

Then, an operation 320 of associating each operating system component C1 . . . Cn to a respective descriptor v1 . . . vin, which indicates the version of the operating system component is performed. Also this operation is performed preferably when designing the first operating system OSD1, writing the version descriptor in a field of the programming script of the component. In general for a i-th operating system OSDi and for a j-th component Cj, the corresponding version descriptor is indicated as vij, where is the index of the different operating system OSDi which can be downloaded in the card 108, while j is the index of the components Cj in which it can subdivided with the operation 310, i.e. j goes from 1 to n.

In this way, components C1 . . . Cn including a respective version descriptor v11 . . . v1$n$ are obtained.

With operation 330, the first operating system OSD1 is downloaded in the card 108. The first operating system OSD1 is downloaded within an image to be loaded with the primary boot loader 11, residing in the memory 1084. When such operation 330 is performed, the card 108 is configured through its processing unit 1082 to store in a version table VT the version v11 . . . V1$n$ of the components C1 . . . Cn, as better specified with respect to Table 1 below. The version table VT resides in the primary boot loader memory area in the non-volatile memory 1084, Then, an operation 340 of storing the components C1 . . . Cn of the first operating system in the dedicated area memory in the non-volatile memory 1084 is performed.

When it is necessary to download a second, further, operating system OSD2, a procedure 400 of downloading is performed, which includes applying the operations 310 and 320 described above, thus obtaining components C1 . . . Cn and corresponding versions v21 . . . V2$n$. Of course the procedure 400 can be executed after the operation 340 after an undetermined amount of time that can be of week, months or also year, e.g. only when it is necessary to upload a data image, including profile and operating system, of another MNO.

Then, when an operation 430 of downloading the second operating system OSD2 in the card 108 is performed, such operation of downloading includes a step 433 of comparing the versions v21 . . . V2$n$ of the components C1 . . . Cn being downloaded to the version of corresponding components already stored in the card 108, in this case v11 . . . v1$n$, which are stored in the version table VT (see Table 1 below).

If the step 433 indicates that a component being downloaded has a version v2$j$ which is different from the version v1$j$ of the corresponding component already stored, then a step 437 and step 439 are performed.

The step 437 provides writing in the column of the table VT corresponding to system OSD2, which is initialized with versions v21 . . . V2$n$, which are equal to versions v11 . . . v1$n$, the number of the new version or instance of the component found having a different version at step 433.

The step 439 provides storing the components having a version different from the versions of the components already stored in the card.

If at the step 433 is found that the version of the component being downloaded is the same of the corresponding component of the first operating system OSD1 stored in the table VT, the component is discarded, i.e. not stored in the memory 1084. All the other components depending on the discarded module are linked with the corresponding version already stored in the memory 1084 of the card 108.

It is underlined that the downloading procedure, including operations 330, 340, 430 does not change the interaction between the card 108 and the MNO remote server 30, such downloading procedure being performed at the card. The card may buffer the incoming components of the operating systems, e.g. to perform then the comparison 433, using for instance a portion of the non-volatile memory, or in variant embodiments, of the volatile memory, depending for instance on the size of the memory available, or also, alternatively, the components can be discarded on the fly, e.g. without storing.

After the downloading of all the components of the second operating system OSD2, and the storing of the sole having a different versions thus in the memory 1084 there will be stored all the components of OSD1 and some components (usually one or two) of OSD2. After the procedure 400 is waited that a profile switch procedure 500 is requested.

As better detailed in the following with reference to FIGS. 5 and 6, a profile switch may take place. If a profile switch is performed it may be for instance necessary to load the second operating system OSD2. In this case, in place of the component Cj or of the components discarded it is used the corresponding component of the first operating system OSD1 which is already stored.

Herebelow in table 1 is represented a possible embodiment of the table VT. In the first column, which is also the index column of the table VT, it is contained a field corresponding to the j-th component Cj. In the following columns are inserted the version vij of the components for each i-th operating system OSDi.

TABLE 1

| Component Cj | OSD1 version Vij | OSD2 version Vij |
| --- | --- | --- |
| Java Card (C1) | v.1.1.2 | v.1.1.2 |
| GlobalPlatform (C2) | v.1.2.0 | v.1.2.0 |
| USIM (C3) | v.1.3.0 | v.1.3.0 |
| ISIM (C4) | v.1.4.0 | v.1.4.0 |
| Authentication (C5) | v.1.2.1 | v.1.3.0 |
| SMS (C6) | v.1.2.0 | v.1.2.0 |

In the example shown, after downloading with the procedure 100 the first operating system OSD1, when it is downloaded the second operating system OSD2 in the comparison operation it is found at step 433 that the Java Card, GlobalPlatform, USIM and ISIM components, supposing that they are evaluated in sequences as C1 . . . C4, have the same version v21 . . . V24, therefore the corresponding modules of the second operating system are discarded, i.e. not stored in the memory 1084. The Authentication component, i.e. C5, at step 233 is found to have a different version descriptor, v.1.3.0 instead of v.1.2.1, therefore the corresponding component C5 is stored for the second operating system in the memory 1084.

The procedure 200 can be of course replicated when a third image containing a third profile and third operating system OSD3 is downloaded, as shown in Table 2, where it is added a column indicating the same instances of component Cj. As shown, in the example represented in Table 2 one can have 1, 2 or 3 instances of the same OS module. The procedure 400 of course can be replicate also to download further operating systems.

TABLE 2

| Component Ci | OSD1 | OSD2 | OSD3 | Instances |
|---|---|---|---|---|
| Java Card (C1) | v.1.1.2 | v.1.1.2 | v.1.1.2 | 1 |
| GlobalPlatform (C2) | v.1.2.0 | v.1.2.0 | v.1.2.0 | 1 |
| USIM (C3) | v.1.3.0 | v.1.3.0 | v.1.3.0 | 1 |
| ISIM (C4) | v.1.4.0 | v.1.4.0 | v.1.5.0 | 2 |
| Authentication (C5) | v.1.2.1 | v.1.3.0 | v.1.3.1 | 3 |
| SMS (C6) | v.1.2.0 | v.1.2.0 | v.1.2.0 | 1 |

When having stored a plurality of operating system, it is possible of course that there are multiple instances of same component, in the example the Authentication component has three different instances, while the ISIM component has two.

When performing a deletion operation it must be preserved all the operating system components that are referenced by at least one MNO profile—deleting e.g. the second profile corresponding to OSD2 would result in removing only one instance, i.e. v.1.3.0 of the Authentication component.

Figure 5:
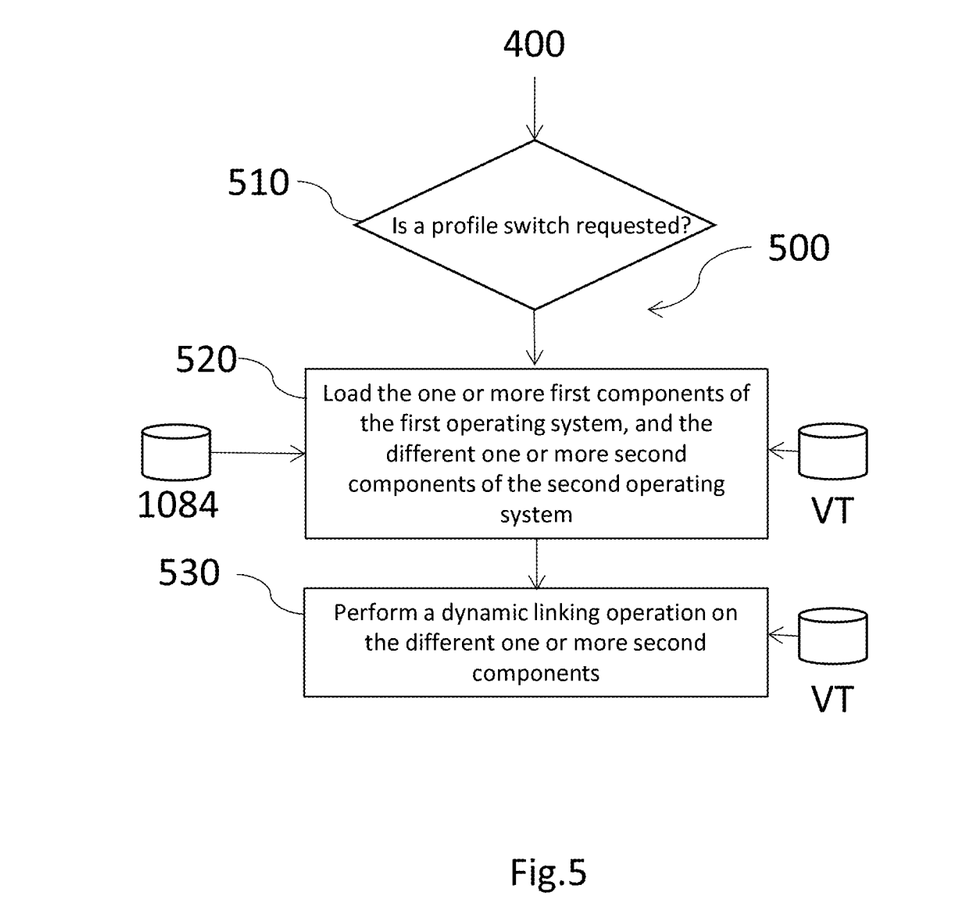
FIG. 5 shows a diagram flow illustrating further operations of the method here described.

In FIG. 5 it is also indicated a procedure 500 which is performed when it is performed a profile switch.

In a step 510 is evaluated if a profile switch is requested, i.e. loading for instance the second operating system OSD2 through the primary boot loader 11 in place of the first operating system OSD1.

In the affirmative, on the basis of the contents of the table VT for the second operating system OSD2, are loaded in a step 520 in the volatile memory the components of the first operating system OSD1 which have the same version descriptor vij. Such components were stored while performing the downloading operation 330 of the first operating system OSD1. Also in step 520 are loaded the component or components of the second operating system OSD2 stored in step 440, since they have a different version descriptor vij: in the example of Table 1 this corresponds to the sole Authentication component, e.g. v25.

Then it is performed a dynamic linking operation 530 on the component having component or components of the second operating system OSD2 with a different version descriptor vij. This is performed so that when the second operating system OSD2 is executed, when an executable is executed at run time, a dynamic linking is performed, in general by copying the content of libraries from persistent storage to the RAM, and filling jump tables and relocating pointer. The dynamic linking by way of example corresponds to loading and linking the libraries, which as it will be shown, correspond to the components needed by the executable.

In particular to support the dynamic linking operation 530 the subdividing step 310 performing a sub step of isolation of the components C1 . . . C2 which in its turn includes defining each of the components C1 . . . Cn as a library. In particular, in a manner per se know, each component Cj as a library includes an interface with the methods exposed, e.g. a list declaring of the functions of the component/library to the other components/library. Also this can correspond to the header.h in C language. Libraries depend on the other for dependency.

Then, to support the dynamic linking operation 530 it is also provided that in the memory 1084 of the card 108 is stored a further table which for each component Cj stores:
an import descriptor indicating:
which module Cj is imported and which version Vij; and/or
which APIs are invoked; and/or
an export descriptor indicating:
which API is exported; and/or
which is the version of the component.

Such further table containing for each component of each operating system OSDi the import descriptor IC and the export descriptor EC can be stored in the memory 1084, preferably in the area of the PBL.

Figure 6:
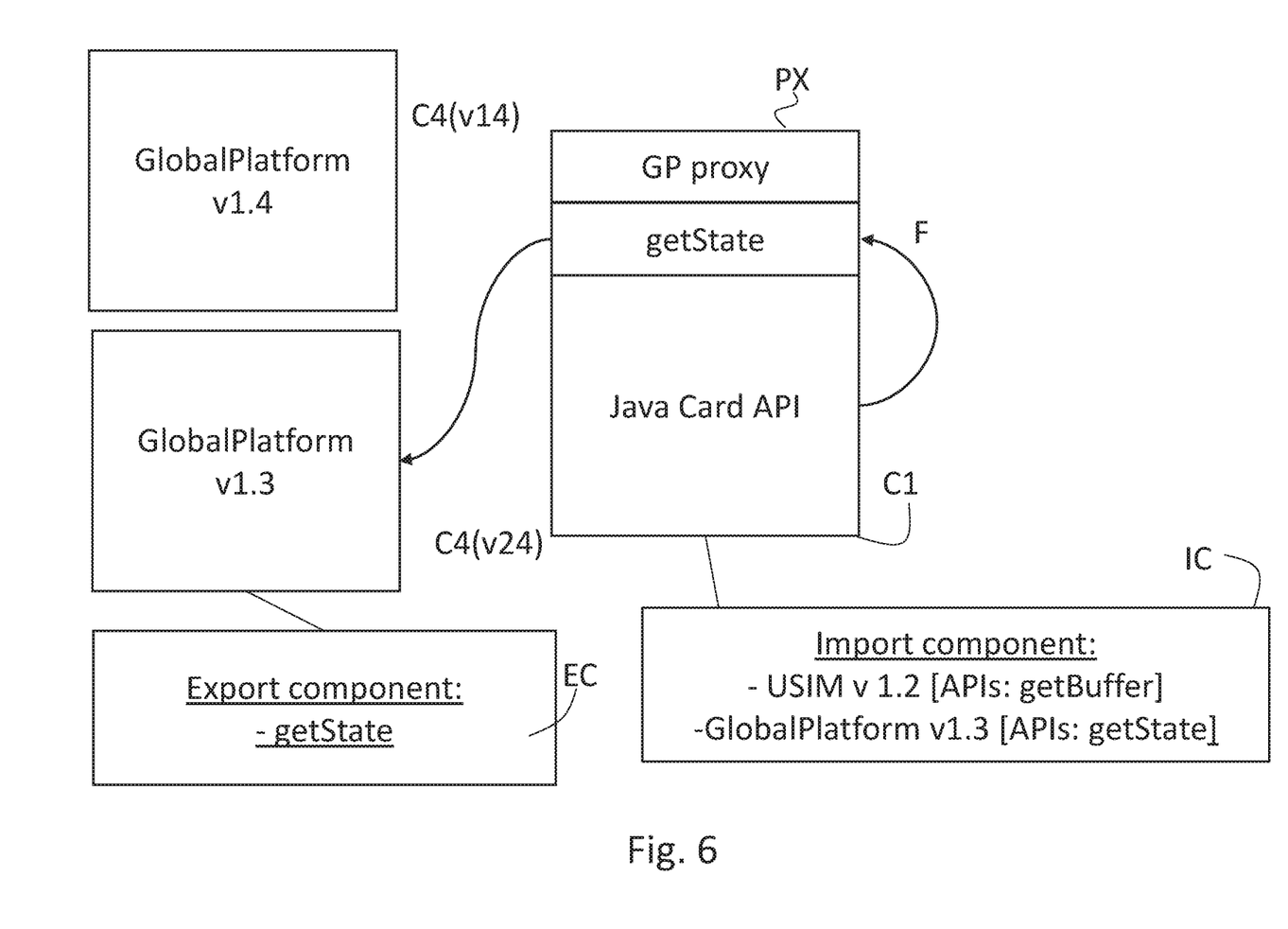
FIG. 6 shows a block schematics of software modules of a card implementing the method here described.

To this regard in FIG. 6 is schematically represented an API of the Java Card, component C1 of given operating system e.g. OSD1, which during execution has to linked to the component C4, using a function F, in the example getstate( ).

In FIG. 6 are shown two instances of the component GlobalPlatform, a first instances C4 (v14) and a second C4 (v24). It is underlined that this example is different from the one shown in Table 1 since the instance of version v14 is version 1.3.0 and the instance of version v24 is version 1.4.0 to have two instances for this component.

The second instance C4 (v24) is associated to an export descriptor EC stored in the further table described above in the memory 1084 indicating which API is exported, in this case the function getstate (and which is the version of the component, in this case v24.

The Java Card component C1 is associated in such further table to an import descriptor IC indicating which component is imported and which version and which APIs are invoked.

In the example is indicated a first component which is imported with the version, USIM v 1.2, and the API invoked, [APIs: getBuffer], and a second component which is imported with the version, which is the shown instance of Globalplatform, C4 (v24), e.g. GlobalPlatform v1.3, and the API invoked [APIs: getState].

Thus when the Java Card API invokes getState of GlobalPlatform is redirected to the component instance of Globalplatform, C4 (v24), through a proxy PX associated to the component Globalplatform, C4 (v24). The proxy PX is a method, in particular a struct, which is used in C language to call the function F. The Java Card API calls the method, calls the function F and the proxy performs an indirection.

During the execution, any functional invocation is performed via an indirection method. The indirection method depends on the program language.

In smart cards typically "C" language is used, where the indirection includes invoking the method through a struct composite data type declaration in the C programming language.

During the dynamic linking, the usage of the import and export descriptors is used to put, in the import component of a first component, in the example C1, the link to the export component of a second component, in the example C4.

In the card systems where the operating system is downloaded over the air, such as in the OFL (Open Firmware Loader) systems, the card performs an authentication of the image containing the operating system which is downloaded, by verifying a cryptographic signature represented by a public key.

According to a further aspect of the solution here described, not only the operating system, but each operating system component C1 . . . Cn of the operating system is cryptographically signed with an asymmetrical cryptography using a public key identifying the operating system issuer or provider.

The card is then configured to:

verify the cryptographic signature of each operating system component C1 . . . Cn being downloaded; and perform the dynamic linking only on components verified as having a cryptographic signature computed by the same issuer, e.g. the operating system provider.

Thus, in general the method for managing the storage of an operating system in an integrated circuit cards using a primary boot loader to load a selected operating system, includes:

subdividing (in step 310) an operating system, such as OSD1, OSD2 in a plurality of operating system components, C1 . . . Cn;

associating (in step 320) one or more of the components in the plurality of operating system components C1 . . . Cn to a descriptor indicating a version, e.g. v11 . . . v1n of the operating system component;

downloading (in steps 330, 430) the one or more components to a non-volatile memory, e.g. memory 1084 of the integrated circuit card 108, the downloading operation including verifying if there is stored in the card an operating system component associated to a same version of the component being downloaded. The verifying is performed by the comparison operation 233 with the version table VT.

In the negative, if the version is different, it is provide storing 239 the component in the card, or else discarding the component from the download operation if the version is found to be the same.

As mentioned, the other components depending on the discarded module are linked with the corresponding version already stored in the memory 1084 of the card 108, while a component stored after the verification is dynamically linked to the other components when the profile switch is enacted).

It is underlined that in variant embodiments the one or more components being downloaded can be a single component. This can happen for maintenance reason, i.e. it is necessary to download a component to substitute a malfunctioning or corrupted component. In that case the substitute component can be associated to a different version descriptor.

Of course, a maintenance operation can be performed downloading an entire new operating system with the sole substitute component associated to a different version descriptor. All the components with the same descriptor, as described above, will be simply discarded from the downloading operation.

For the download, the mechanism assumes that there is no change in downloading protocol over the UICC. The solution described optimizes usage of the memory of the card.

In variant embodiments it is possible however to optimize also the downloading protocol.

In such embodiment the MNO server, for instance coinciding with the host 30 hosting a Personal Creator, retrieves the list of components on the UICC card 108. This can be done accessing the version table VT.

Then the server downloads only the components that need to be downloaded, i.e. are not present on the UICC.

Thus the method in this embodiment provides that there is stored in the card 108 an operating system component associated to a same version of the component being downloaded, the downloading server retrieves the corresponding information, in particular from the version table VT, and performs the verifying at the server. The verifying including performing operations corresponding to step 233, which are performed at server instead of being performed at the card, also discarding the component from download takes place at the server while the storing 239 is performed by the server at the remotely connected card.

The described solution thus has several advantages with respect to the prior art solutions.

The method here described allows to manage multiple operating system, or also substitute single components of the operating system in cards using a primary boot loader to load the data image of the MNOs including the operating system.

The method here described allows to manage multiple operating systems with a significantly lower chip memory usage with respect to the know solutions.

The method here described can also reduce the amount of data transmitted from the remote server, to store an operating system.

Of course, without prejudice to the principle of the disclosure, the details of construction and the embodiments may vary widely with respect to what has been described and illustrated herein purely by way of example, without thereby departing from the scope of the present disclosure.

What is claimed is:

1. A method for managing storage of an operating system in an integrated circuit card, the method comprising:

subdividing an operating system into a plurality of operating system components;

associating one or more operating system components of the plurality of operating system components to a descriptor indicating a version of the one or more operating system components;

downloading the one or more operating system components to a memory of the integrated circuit card, wherein the downloading comprises determining whether each of the one or more operating system components being downloaded is a same version as a corresponding component of operating system components already stored in the integrated circuit card;

storing a first component of the one or more operating system components in response to determining that the first component has a version that is different from a corresponding first component of the operating system components already stored in the integrated circuit card; and discarding a second component of the one or more operating system components being downloaded from the download operation in response to determining that the second component has a version that is the same as a corresponding second component of the operating system components already stored in the integrated circuit card.

2. The method of claim 1, wherein downloading the one or more operating system components to the memory of the integrated circuit card comprises downloading the one or more operating system components to a non-volatile memory of the integrated circuit card.

3. The method of claim 1, wherein associating the one or more operating system components of the plurality of operating system components to the descriptor indicating the version of the one or more operating system components comprises: associating each operating system component of the plurality of operating system components to the descriptor indicating the version of the operating system component.

4. The method of claim 3, wherein downloading the one or more operating system components to the memory of the integrated circuit card comprises downloading each operating system component of the plurality of operating system components to the memory of the integrated circuit card.

5. The method of claim 1, wherein associating the one or more operating system components of the plurality of operating system components to the descriptor indicating the version of the one or more operating system components comprises:
associating a pre-determined component of the plurality of operating system components to the descriptor indicating the version of the operating system component.

6. The method of claim 5, wherein downloading the one or more operating system components to the memory of the integrated circuit card comprises downloading the pre-determined component to the memory of the integrated circuit card.

7. The method of claim 1, wherein determining whether each of the one or more operating system components being downloaded is a same version as the corresponding operating system component already stored in the integrated circuit card comprises comparing the version of the one or more operating system components being downloaded to the version of a corresponding component already stored in the memory of the card in a version table residing in the memory.

8. The method of claim 1, wherein the one or more operating system components comprises at least one of Kernel, Java Card, Short Message Service (SMS) protocol, Authentication, Universal Subscriber Identity Module (USIM), or Global Platform components of the operating system.

9. The method of claim 1, further comprising performing a dynamic linking operation on the operating system component stored in the integrated circuit card after downloading the one or more operating system components to a memory of the integrated circuit card.

10. The method of claim 9, wherein the dynamic linking operation comprises isolating the one or more operating system components being downloaded by defining the one or more operating system components as a library.

11. The method of claim 10, further comprising storing, in the integrated circuit card, at least one of:
an import descriptor indicating at least one of: a module that is imported and its associated version, and which application program interface (API) is invoked; or
an export descriptor indicating at least one of: an API that is exported and the version of the component.

12. The method of claim 1, wherein determining whether each of the one or more operating system components being downloaded is a same version as the corresponding operating system component already stored in the integrated circuit card comprises:
retrieving, to a downloading server, version information from a version table and performing the determining at the downloading server.

13. The method of claim 1, wherein each of the one or more operating system components of the plurality of operating system components is cryptographically signed with an asymmetrical cryptographic signature using a public key identifying an operating system issuer.

14. The method of claim 13, wherein the integrated circuit card is configured to:
verify the asymmetrical cryptographic signature of each of the one or more operating system components being downloaded; and
perform dynamic linking only on each of the one or more operating system components verified as having a cryptographic signature computed by a same operating system provider.

15. A system, comprising:
a remove server; and
a mobile device comprising an integrated circuit card configured to exchange data with the remove server, wherein the integrated circuit card is configured to:
subdivide an operating system into a plurality of operating system components;
associate one or more operating system components of the plurality of operating system components to a descriptor indicating a version of the one or more operating system components;
download the one or more operating system components to a memory of the integrated circuit card, wherein the integrated circuit card is configured to download by determining whether each of the one or more operating system components being downloaded is a same version of a corresponding operating system component already stored in the integrated circuit card;
store a first component of the one or more operating system components in response to determining that the first component has a version that is different from a corresponding first component of the operating system components already stored in the integrated circuit card; and
discard a second component of the one or more operating system components being downloaded from the download operation in response to determining that the second component has a version that is the same as a corresponding second component of the operating system components already stored in the integrated circuit card.

16. The system of claim 15, wherein the integrated circuit card comprises an embedded Universal Integrated Circuit Card.

17. The system of claim 15, wherein the memory comprises a non-volatile memory of the integrated circuit card.

18. A computer-program product loaded into a non-transitory memory of at least one processor, wherein the computer-program product comprises software code for implementing the steps of:
subdividing an operating system into a plurality of operating system components;
associating one or more operating system components of the plurality of operating system components to a descriptor indicating a version of the one or more operating system components;
downloading the one or more operating system components to a memory of an integrated circuit card, wherein the downloading comprises determining whether each of the one or more operating components being downloaded is a same version of a corresponding operating system component already stored in the integrated circuit card;

storing a first component of the one or more operating system components in response to determining that the first component has a version that is different from a corresponding first component of the operating system components already stored in the integrated circuit card; and discarding a second component of the one or more operating system components being downloaded from the download operation in response to determining that the second component has a version that is the same as a corresponding second component of the operating system components already stored in the integrated circuit card.

19. The computer-program product of claim 18, wherein each of the one or more operating system components of the plurality of operating system components is cryptographically signed with an asymmetrical cryptography using a public key identifying an operating system issuer.

20. The computer-program product of claim 18, wherein determining whether each of the one or more operating system components being downloaded is a same version as a corresponding operating system component already stored in the integrated circuit card comprises:

retrieving, to a downloading server, version information from a version table and performing the determining at the downloading server.

\* \* \* \* \*